March 20, 1928. 1,663,441
A. D. CLAWSON
BOX
Filed June 24, 1925 2 Sheets-Sheet 1
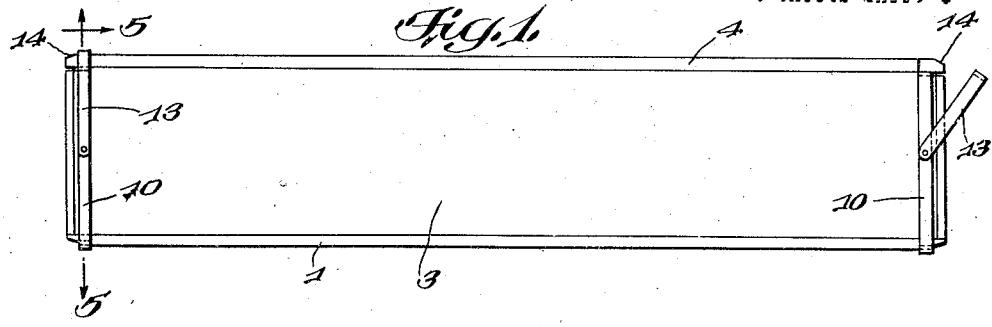
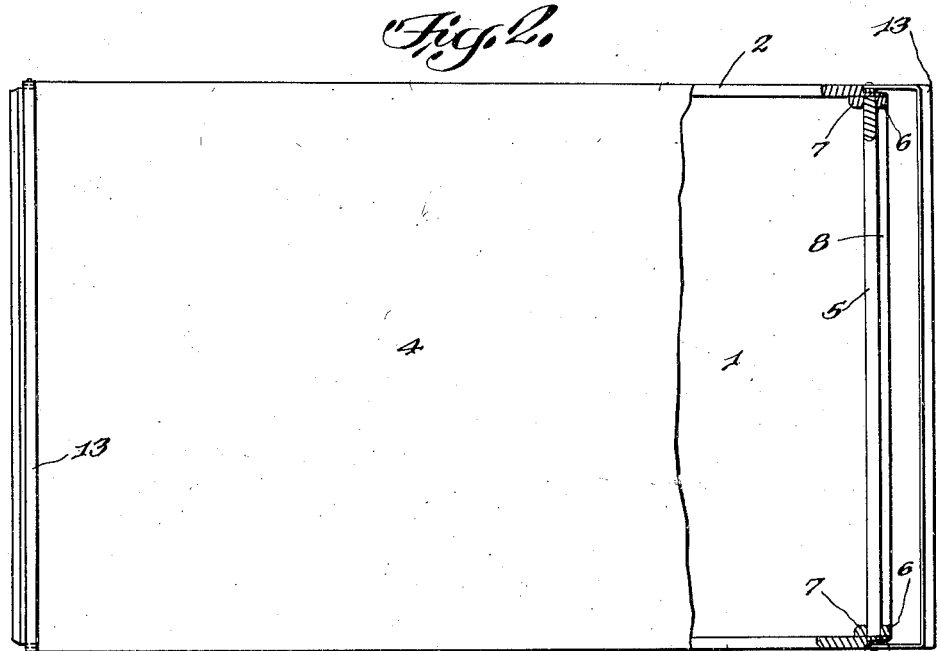
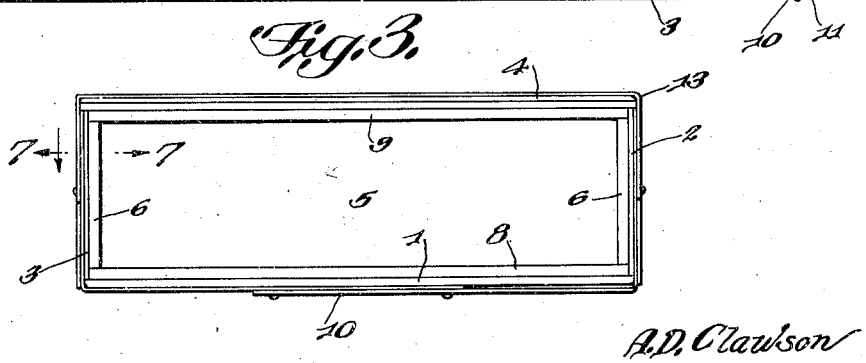
A. D. Clawson
INVENTOR
BY Victor J. Evans
ATTORNEY March 20, 1928.

A. D. CLAWSON

BOX

Filed June 24, 1925　　2 Sheets-Sheet 2

1,663,441

A. D. Clawson  INVENTOR

BY Victor J. Evans  ATTORNEY

Patented Mar. 20, 1928.

1,663,441

UNITED STATES PATENT OFFICE.

AQUILLER D. CLAWSON, OF CHICAGO, ILLINOIS.

BOX.

Application filed June 24, 1925. Serial No. 39,358.

This invention relates to new and useful improvements in boxes and more particularly to a collapsible box. The main object of my invention is the provision of a collapsible box whereby the same may be quickly and readily taken apart and placed in compact form so as to occupy a minimum space when not in use and at the same time can be readily set up ready for use.

One of the principal objects of my invention is the provision of a box which is especially adapted for use in meat packing plants wherein the meat is placed in boxes prior to being placed in a refrigeration plant and in this process the boxes are usually destroyed in order to remove the meat therefrom, but with the use of my improved collapsible box, the sides, top and bottom and end walls may be readily taken apart so that the meat can be removed from the box when desired without destroying the box itself.

A further object of my invention is the provision of a box of the above character wherein removable means is employed for retaining the box in its operative position and for clamping the cover in position on the box until it is desired to disassemble the same.

Figure 4:
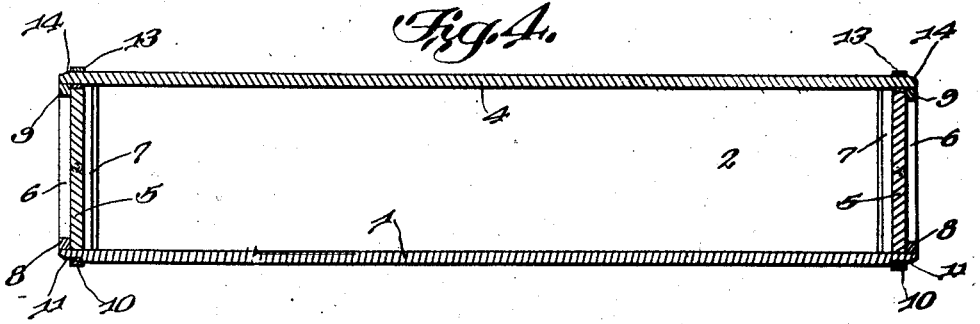
Figure 5:
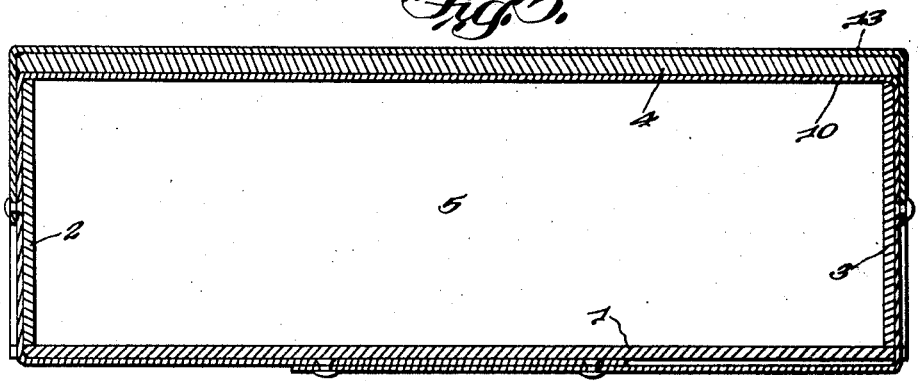
Figure 6:
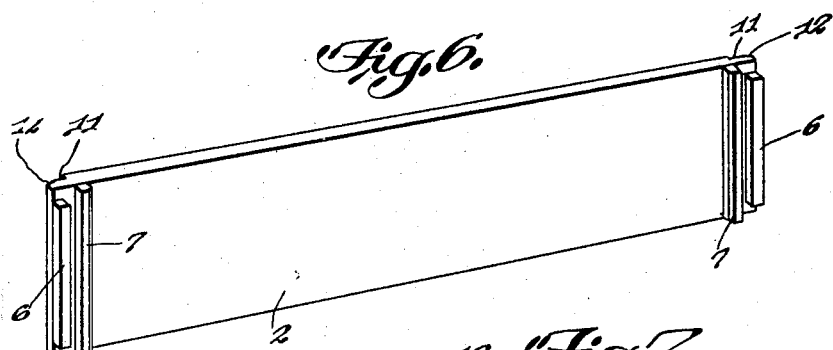
Figure 7:
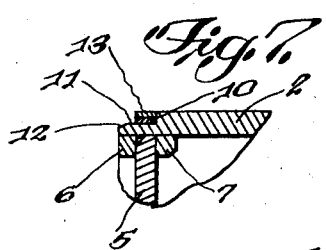

With the above and other objects in view, my invention consists in the novel features of construction and the combination and arrangement of parts to be hereinafter more fully described, pointed out in the claim and shown in the accompanying drawings, in which:

Fig. 1 is a side elevation of a box constructed in accordance with my invention, Fig. 2 is a top plan view, parts being broken away and illustrated in cross section, Fig. 3 is an end elevation, Fig. 4 is a longitudinal sectional view, Fig. 5 is an enlarged transverse sectional view, taken on the line 5—5 of Fig. 1, Fig. 6 is a detailed perspective view of one of the side members, and Fig. 7 is a section on the line 7—7 of Fig. 3.

In carrying out my invention, the bottom 1, sides 2 and 3, top 4 and end pieces 5 are all made as separable members. The side walls 2 and 3 of the box are provided with spaced cleats 6 and 7 at the ends thereof with the ends of the cleats 6 cut off so as to be remote from the top and bottom edges of the side walls.

The bottom member 1 has a transverse cleat 8 at each end thereof fitting against the lower ends of the cleats 6 as is illustrated in Fig. 4.

The ends 5 of the box are fitted into the space between the cleats 6 and 7 so as to securely retain them against lateral movement and the outer face thereof abuts against the cleats 8. The bottom or top member 4 is provided with end cleats 9 which rest upon the upper ends of the cleats 6 so that when the top, bottom, ends and sides are fitted together as shown in Fig. 4, the several parts will be closely fitted together and the cleats so positioned relative to each other as to prevent lateral or longitudinal movement of any of the parts.

In order to retain the several sections of the box in set-up position, a metal strip 10 extends entirely around the box at each end thereof and these strips are fitted onto the shoulders 11 formed by the cutting away of a portion of each end of the box and the shoulders are provided with bevelled portions 12 whereby the strips may be readily placed in position. It will be noted that the strips extend across the upper edge of the end pieces so as to securely retain the end pieces in spaced relation with the cover when same is removed from the box. When the box is set up ready for use the same is packed with meat or any other material and the cover then placed in position with the cleats 9 fitting into the upper ends of the cleats 6 and U shaped yokes 13 are provided for retaining the cover in position. These yokes have their ends pivotally connected to the side portions of the strips 10 as is clearly shown in Fig. 5, so that the intermediate portions of the U shaped yokes may be swung upwardly and engaged over the top of the box as shown in Fig. 5, the ends of the top member being bevelled as indicated at 14 to permit the intermediate portions of the yokes to be fitted into clamping engagement with the top.

From the above it will be apparent that I have provided a simple and inexpensive box of the character set forth wherein the parts of the box are so arranged that the box may be quickly disassembled and at the same time readily set up for use. Thus it will be apparent that in using this construction for meat packing purposes, it will be noted that the box may be quickly disassembled by removing the strips 11 from the ends thereof after the cover or top has been removed so that the box may be continuously used for the same purpose without causing the destruction of the same in order to remove the contents.

Another advantage of having the strips 11 set onto the shoulders formed therefor, is that in placing boxes one on top of the other, it will reduce the possibility of removal of the strip through contact with the other boxes.

While I have set forth the particular use for this type of box, it will be apparent that the same may be used for various other purposes.

While I have shown and described the preferred form of my invention, it will be obvious that various changes in the details of construction and the arrangement and proportions may be resorted to for successfully carrying my invention into practice without departing from the scope of the appended claim.

Having thus described my invention, what I claim is:

A box structure including a body comprising bottom, side, and end portions, spaced cleats secured to the side members adjacent the ends thereof, the cleats disposed toward the ends being of shorter length than those disposed away from the ends, cleats secured to a cover member and the bottom member and adapted to rest upon the ends of the shorter of the cleats, said end members being adapted to be slidably positioned between the spaced cleats with their lower edge portions abutting the cleats of the bottom member, said side and bottom members having portions cut from one face thereof adjacent the ends adapted to provide shoulders, connecting bands each having end portions secured together and arranged for connecting the end members, side members, and bottom member in distended position, and bands connected to the side members fitting over beveled edges on the cover member for connecting the cover to the box when in distended position.

In testimony whereof I affix my signature.

AQUILLER D. CLAWSON